US009783666B2

(12) United States Patent
Grestenberger et al.

(10) Patent No.: US 9,783,666 B2
(45) Date of Patent: Oct. 10, 2017

(54) POLYPROPYLENE COMPOSITION WITH EXCELLENT PAINT ADHESION

(71) Applicant: Borealis AG, Vienna (AT)

(72) Inventors: Georg Grestenberger, St. Peter in der Au (AT); Claudia Kniesel, Linz (AT); Daniela Mileva, Linz (AT); Dietrich Gloger, Linz (AT)

(73) Assignee: Borealis AG (AT)

( * ) Notice: Subject to any disclaimer, the term of this patent is extended or adjusted under 35 U.S.C. 154(b) by 0 days.

(21) Appl. No.: 15/100,197

(22) PCT Filed: Dec. 1, 2014

(86) PCT No.: PCT/EP2014/076112
§ 371 (c)(1),
(2) Date: May 27, 2016

(87) PCT Pub. No.: WO2015/082403
PCT Pub. Date: Jun. 11, 2015

(65) Prior Publication Data
US 2017/0029609 A1 Feb. 2, 2017

(30) Foreign Application Priority Data

Dec. 4, 2013 (EP) .................................... 13195768

(51) Int. Cl.
*C08K 3/34* (2006.01)
*C08L 23/12* (2006.01)
*C08L 23/14* (2006.01)

(52) U.S. Cl.
CPC ............. *C08L 23/12* (2013.01); *C08L 23/142* (2013.01); *C08L 2205/025* (2013.01); *C08L 2207/02* (2013.01)

(58) Field of Classification Search
CPC ................. C08L 23/12; C08L 2207/02; C08L 2205/025
USPC ........................................................ 524/451
See application file for complete search history.

(56) References Cited

U.S. PATENT DOCUMENTS 4,945,005 A * 7/1990 Aleckner, Jr. ........... C08L 23/06
428/500

FOREIGN PATENT DOCUMENTS

| EP | 0887379 A1 | 12/1998 |
| EP | 491566 B2 | 3/2005 |
| EP | 2251375 A1 | 11/2010 |
| EP | 2495264 B1 | 5/2013 |
| WO | 8707620 A1 | 12/1987 |
| WO | 9807564 A1 | 10/1988 |
| WO | 9212182 A1 | 7/1992 |
| WO | 9219653 A1 | 11/1992 |
| WO | 9219658 A1 | 11/1992 |
| WO | 9924478 A1 | 5/1999 |
| WO | 9924479 A1 | 5/1999 |
| WO | 0068315 A1 | 11/2000 |
| WO | 04000899 A1 | 12/2003 |
| WO | 2004111095 A1 | 12/2004 |

OTHER PUBLICATIONS

Singh, Gurmeet, et al., "Triad Sequence Determination of Ethylene-Propylene Copolymers—Application of Quantitative 13C NMR", Polymer Testing 28 (2009) 475-479.
European Search Report dated Feb. 24, 2014.
Busico, Vincenzo, et al., "ALK-1-ENE Polymerization in the Presence of a Monocyclopentadienyl Zirconium(IV) Acetamidinate Catalyst: Microstructural and Mechanical Insights", Macromol. Rapid Commun. 2007, 28, 1128-1134.
Cheng, H.N., "13C NMR Analysis of Ethylene-Propylene Rubbers", Macromolecules 1984, 17, 1950-1955.
Resconi, Luigi, et al., "Selectivity in Propene Polymerization With Metallocene Catalysts", Chem. Rev. 2000, 100, 1253-1345.
Wang, Wen-Jun, et al., "Structural Analysis of Ethylene/Propylene Copolymers Synthesized With a Constrained Geometry Catalyst", Macromolecules 2000, 33, 1157-1162.

* cited by examiner

*Primary Examiner* — Hui Chin
(74) *Attorney, Agent, or Firm* — Tarolli, Sundheim, Covell & Tummino LLP

(57) ABSTRACT

The present invention is directed to a polypropylene composition, an article comprising the polypropylene composition as well as the use of the polypropylene composition to enhance paint adhesion of a molded article.

16 Claims, No Drawings

POLYPROPYLENE COMPOSITION WITH EXCELLENT PAINT ADHESION

The present invention is directed to a polypropylene composition (C), an article comprising the polypropylene composition (C) as well as the use of the polypropylene composition (C) to enhence paint adhesion of a molded article.

In the field of automotive applications, polyolefins such as polypropylenes are the material of choice as they can be tailored to specific purposes needed. For instance, heterophasic polypropylenes are widely used in the automobile industry (for instance in bumper applications) as they combine good stiffness with reasonable impact strength behavior. Heterophasic polypropylenes contain a polypropylene matrix in which an amorphous phase is dispersed. The amorphous phase contains a plastomer; like a linear low density polyethylene (LLDPE), or a propylene copolymer rubber, like an ethylene propylene rubber (EPR) or an ethylene propylene diene monomer polymer (EPDM). In the case of propylene copolymer rubber the heterophasic polypropylene may contain additionally a crystalline polyethylene to some extent.

However, the surface of polyolefins is rather smooth and the polarity rather low resulting in unfavorable prerequisites for interactions with a coating material. Thus, for demanding applications like automotive parts a pretreatement as well as the application of an adhesion promoting layer (a so called primer) is typically used to ensure proper paint adhesion. However, due to environmental reasons it is desired to reduce the use of primers to a minimum or to avoid the use of primers at all.

Thus, the object of the present invention is to provide a material which enables a skilled person to produce molded articles having a good stiffness/impact balance and high paint adhesion even without the use of primers.

The finding of the present invention is to provide a polypropylene composition (C) having a defined combination of a propylene copolymer (R-PP), a heterophasic propylene copolymer (HECO) which xylene cold soluble fraction has an intrinsic viscosity (IV) determined according to DIN ISO 1628/1 (in decalin at 135° C.) of more than 2.1 dl/g and a mineral filler (F).

Accordingly the present invention is directed to a polypropylene composition (C), the polypropylene composition (C) comprising
(a) 15.0 to 60.0 wt.-%, based on the total weight of the composition (C), of a heterophasic propylene copolymer (HECO),
  (a1) said heterophasic propylene copolymer (HECO) has a melt flow rate MFR$_2$ (230° C.) measured according to ISO 1133 in the range of above 1.0 to 20.0 g/10 min;
  (a2) the xylene cold soluble (XCS) fraction of the heterophasic propylene copolymer (HECO) has an intrinsic viscosity determined according to DIN ISO 1628/1 (in decalin at 135° C.) in the range of more than 2.1 to 9.0 dl/g; and
  (a3) the comonomer content of the xylene cold soluble (XCS) fraction of the heterophasic propylene copolymer (HECO) is in the range of 10.0 to 45.0 wt.-%;
(b) 10.0 to 45.0 wt.-%, based on the total weight of the composition (C), of a propylene copolymer (R-PP) having
  (b1) a comonomer content in the range of 1.5 to 8.0 wt.-%; and
  (b2) a melt flow rate MFR$_2$ (230° C.) measured according to ISO 1133 in the range of 5.0 to 100.0 g/10 min; and
(c) 20.0 to 40.0 wt.-%, based on the total weight of the composition (C), of a mineral filler (F), said mineral filler (F) is preferably selected from the group consisting of talcum, wollastonite, caolin and mica.

In one embodiment the polypropylene composition (C) has a melt flow rate MFR$_2$ (230° C.) measured according to ISO 1133 in the range of 5.0 to 45.0 g/10 min.

In another preferred embodiment the heterophasic propylene copolymer (HECO) has
(a) a comonomer content in the range of 5.0 to 20.0 wt.-%; and/or
(b) a xylene cold soluble content (XCS) determined according ISO 16152 (25° C.) of below 40.0 wt.-%, preferably in the range of 8.0 to 35.0 wt.-%.

In one especially preferred embodiment the heterophasic propylene copolymer (HECO) comprises a propylene homopolymer (H-PP) acting as a matrix and an elastomeric propylene copolymer (E) being dispersed in said matrix, wherein preferably
(a) said propylene homopolymer (H-PP) has a melt flow rate MFR$_2$ (230° C.) measured according to ISO 1133 in the range of above 35.0 to 400 g/10 min; and/or
(b) the heterophasic propylene copolymer (HECO) fulfills the in-equation (III)

$$\frac{MFR(HPP)}{MFR(HECO)} \geq 3.0 \qquad (III)$$

wherein
MFR(HPP) is the melt flow rate MFR (230° C.) measured according to ISO 1133 of the propylene homopolymer (H-PP) and
MFR(HECO) is the melt flow rate MFR (230° C.) measured according to ISO 1133 of the heterophasic propylene copolymer (HECO).

According to one embodiment of the present invention, the propylene copolymer (R-PP) has
(a) a glass transition temperature in the range of −12 to +2° C.; and/or
(b) no glass transition temperature below −20° C.

According to another embodiment of the present invention, the propylene copolymer (R-PP) has
(a) a melting temperature in the range of 135 to 165° C., and/or
(b) a tensile modulus of at least 800 MPa, and/or
(c) a Charpy notched impact strength at +23° C. of ≥4 kJ/m².

According to yet another embodiment of the present invention, the propylene copolymer (R-PP)
(a) has 2,1 regio-defects of at most 0.4% determined by $^{13}$C-NMR spectroscopy; and/or
(b) is monophasic.

According to one embodiment of the present invention, the propylene copolymer (R-PP) comprises a comonomer selected from ethylene, C$_4$ to C$_{12}$ α-olefin and mixtures thereof, preferably the comonomer is ethylene.

According to another embodiment of the present invention, the propylene copolymer (R-PP) comprises two fractions, a first propylene copolymer fraction (R-PP1) and a second propylene copolymer fraction (R-PP2), said first propylene copolymer fraction (R-PP1) differs from said second propylene copolymer fraction (R-PP2) in the comonomer content.

According to yet another embodiment of the present invention,
(a) the weight ratio between the first propylene copolymer fraction (R-PP1) and the second propylene copolymer fraction (R-PP2) of the propylene copolymer (R-PP) [(R-PP1):(R-PP2)] is 70:30 to 30:70; and/or
(b) the comonomers for the first propylene copolymer fraction (R-PP1) and the second propylene copolymer fraction (R-PP2) of the propylene copolymer (R-PP) are selected from ethylene, C$_4$ to C$_{12}$ α-olefin, and mixtures thereof, preferably the comonomers for the first propylene copolymer fraction (R-PP1) and the second propylene copolymer fraction (R-PP2) are the same and are selected from ethylene, $C_4$ to $C_{12}$ α-olefin, and mixtures thereof.

According to one embodiment of the present invention,
(a) the first propylene copolymer fraction (R-PP1) of the propylene copolymer (R-PP) is the comonomer lean fraction and the second propylene copolymer fraction (R-PP2) of the propylene copolymer (R-PP) is the comonomer rich fraction and/or
(b) the first propylene copolymer fraction (R-PP1) of the propylene copolymer (R-PP) has a lower comonomer content than the propylene copolymer (R-PP).

According to another embodiment of the present invention, wherein
(a) the first propylene copolymer fraction (R-PP1) and the second propylene copolymer fraction (R-PP2) of the propylene copolymer (R-PP) fulfill together the in-equation (IV)

$$\frac{Co\ (R-PP2)}{Co\ (R-PP1)} \geq 1.0; \tag{IV}$$

wherein
Co (R-PP1) is the comonomer content [wt.-%] of the first propylene copolymer fraction (R-PP1),
Co (R-PP2) is the comonomer content [wt.-%] of the second propylene copolymer fraction (R-PP2). and/or,
(b) the first propylene copolymer fraction (R-PP1) and the propylene copolymer fraction (R-PP) fulfill together the in-equation (V)

$$\frac{Co\ (R-PP)}{Co\ (R-PP1)} \geq 1.0 \tag{V}$$

wherein
Co (R-PP1) is the comonomer content [wt.-%] of the first propylene copolymer fraction (R-PP1),
Co (R-PP) is the comonomer content [wt.-%] of the propylene copolymer (R-PP).

According to yet another embodiment of the present invention, the mineral filler (F) is talc, preferably the talc has an average particle size d50 in the range of 0.5 to 20.0 μm.

The present invention also relates to an article comprising the polypropylene composition (C).

It is preferred that the article is an automotive article, preferably an exterior or interior automotive article selected from bumpers, body panels, rocker panels, side trims, step assists, spoilers and dash boards.

A further aspect of the present invention is the use of the above polypropylene composition (C) to enhance paint adhesion of a molded article, preferably to enhance paint adhesion of an injection molded article, such as automotive articles. It is preferred to keep the average failed area, which is a measure of paint adhesion, of automotive articles, such as exterior or interior automotive articles, equal or below 90 mm².

In the following the invention will be described in more detail.

Polypropylene Composition (C)

It is one requirement of the present invention that the polypropylene composition (C) comprises
(a) 15.0 to 60.0 wt.-%, preferably 20 to 55 wt.-%, more preferably 25 to 55 wt.-%, based on the total weight of the composition (C), of the heterophasic propylene copolymer (HECO),
(b) 10.0 to 45.0 wt.-%, preferably 12 to 42 wt.-%, more preferably 14 to 40 wt.-%, based on the total weight of the composition (C), of the propylene copolymer (R-PP); and
(c) 20.0 to 40.0 wt.-%, preferably 25 to 38 wt.-%, more preferably 28 to 35 wt.-%, based on the total weight of the composition (C), of the mineral filler (F).

Typically the polypropylene composition (C) has a rather low melt flow rate. It is thus desired that the polypropylene composition (C) has a melt flow rate $MFR_2$ (230° C.) measured according to ISO 1133 in the range of 3.0 to 45.0 g/10 min. More specifically, the polypropylene composition (C) has a melt flow rate $MFR_2$ (230° C.) measured according to ISO 1133 in the range of 5.0 to 35.0 g/10 min. For example, the polypropylene composition (C) has a melt flow rate $MFR_2$ (230° C.) measured according to ISO 1133 in the range of 5.0 to 25.0 g/10 min, like in the range of 6.0 to 20.0 g/10 min.

Preferably, the polypropylene composition (C) fulfils the in-equation (I), more preferably in-equation (Ia), yet more preferably in-equation (Ib), still more preferably in-equation (Ic)

$$\frac{MFR(RPP)}{MFR(HECO)} > 1.70 \tag{I}$$

$$20.0 > \frac{MFR(RPP)}{MFR(HECO)} > 1.75 \tag{Ia}$$

$$15.0 > \frac{MFR(RPP)}{MFR(HECO)} > 1.80 \tag{Ib}$$

$$12.0 > \frac{MFR(RPP)}{MFR(HECO)} > 4.00 \tag{Ic}$$

wherein
MFR(RPP) is the melt flow rate MFR (230° C.) measured according to ISO 1133 of the propylene copolymer (R-PP) and
MFR(HECO) is the melt flow rate MFR (230° C.) measured according to ISO 1133 of the heterophasic propylene copolymer (HECO);

As will be discussed in more detail below, the heterophasic propylene copolymer (HECO) comprises a propylene homopolymer (H-PP) and an elastomeric propylene copolymer (E). Accordingly it is preferred that the polypropylene composition (C) fulfils in-equation (II), more preferably in-equation (IIa), yet more preferably in-equation (IIb), still more preferably in-equation (IIc)

$$\frac{MFR(HPP)}{MFR(RPP)} > 1.80 \tag{II}$$

$$20.0 > \frac{MFR(HPP)}{MFR(RPP)} > 2.00 \tag{IIa}$$

$$15.0 > \frac{MFR(HPP)}{MFR(RPP)} > 2.50 \tag{IIb}$$

$$20.0 > \frac{MFR(HPP)}{MFR(RPP)} > 4.00 \tag{IIc}$$

wherein
MFR(HPP) is the melt flow rate MFR (230° C.) measured according to ISO 1133 of the propylene homopolymer (H-PP) of the heterophasic propylene copolymer (HECO) and
MFR(RPP) is the melt flow rate MFR (230° C.) measured according to ISO 1133 of the propylene copolymer (R-PP).

It is further preferred that the polypropylene composition (C) has a good stiffness/impact balance. It is thus preferred that the polypropylene composition (C) shows good impact behavior. Accordingly it is appreciated that the polypropylene composition (C) has Charpy notched impact strength at +23° C. of at least 1.0 kJ/m², more preferably in the range of 1.0 to 20 kJ/m², still more preferably in the range of 2.0 to 15 kJ/m², like in the range of 2.0 to 12 kJ/m² and/or Charpy notched impact strength at −20° C. of at least 1.0 kJ/m², more preferably in the range of 1.0 to 15 kJ/m², still more preferably in the range of 1.0 to 10 kJ/m², like in the range of 1.0 to 5.0 kJ/m².

Additionally or alternatively, the tensile modulus of the polypropylene composition (C) should be rather high. It is preferred that the flexural modulus of the polypropylene composition (C) is in the range from 2,800 to 4,500 MPa, more preferably in the range of 3,000 to 4,300 MPa, even more preferably of 3,300 to 4,000 MPa, still more preferably in the range of 3,500 to 4,000 MPa.

According to one embodiment the polypropylene composition (C) comprises as main polymer components only the heterophasic propylene copolymer (HECO) and the propylene copolymer (R-PP). In other words it is preferred that the polypropylene composition (C) comprises not more than 10.0 wt.-%, more preferably not more than 5.0 wt.-%, like not more than 2.0 wt.-%, based on the total weight of the composition (C), of polymers other than the heterophasic propylene copolymer (HECO) and the propylene copolymer (R-PP). Such other polymers may be introduced in the polypropylene composition (C) as they are used as carrier for suitable additives.

The polypropylene composition (C) of the instant invention may contain up to 5.0 wt.-% additives excluding the mineral filler as define in detail below (F), like antioxidants, slip agents and antiblocking agents. Preferably, the total content of additives in the polypropylene composition (C) is below 5.0 wt.-%, like below 4.0 wt.-%, based on the total weight of the polypropylene composition (C).

In the following the individual components of the polypropylene composition (C) are described in more detail.

The Heterophasic Propylene Copolymer (HECO)

As mentioned above, the polypropylene composition (C) according to the present invention comprises as an essential component a heterophasic propylene copolymer (HECO).

According to this invention the heterophasic propylene copolymer (HECO) has a melt flow rate $MFR_2$ (230° C.) measured according to ISO 1133 in the range of above 1.0 to 20.0 g/10 min, preferably in the range of 1.0 to 15.0 g/10 min, more preferably in the range of 2.0 to below 12.0 g/10 min, like in the range of 2.0 to 11.5 g/10 min or 2.0 to 8.0 g/10 min.

The heterophasic propylene copolymer (HECO) comprises apart from propylene comonomers such as ethylene and/or $C_4$ to $C_{12}$ α-olefins, in particular ethylene and/or $C_4$ to $C_{10}$ α-olefins, e.g. 1-butene and/or 1-hexene. Preferably the heterophasic propylene copolymer (HECO) comprises, especially consists of, monomers copolymerizable with propylene from the group consisting of ethylene, 1-butene and 1-hexene. More specifically the heterophasic propylene copolymer (HECO) comprises—apart from propylene—units derivable from ethylene and/or 1-butene. Thus in an especially preferred embodiment the heterophasic propylene copolymer (HECO) comprises units derivable from ethylene and propylene only.

The comonomer content, preferably the ethylene content, of the heterophasic propylene copolymer (HECO) preferably is below 20.0 wt-%, more preferably not more than 15.0 wt-%, still more preferably in the range of 3.5 to 20.0 wt-%, like 5.0 to 20.0 wt.-%, yet more preferably in the range of more than 5.0 to 15.0 wt-%, still yet more preferably in the range of 5.5 to 14.0 wt.-%, like in the range of 6.0 to 13.5 wt.-%.

Preferably it is desired that the heterophasic propylene copolymer (HECO) is thermo mechanically stable. Accordingly it is appreciated that the heterophasic propylene copolymer (HECO) has a melting temperature ($T_m$) of at least 135° C., more preferably in the range of 135 to 168° C.

The heterophasic propylene copolymer (HECO) of the present invention is a heterophasic system with balanced comonomer/intrinsic viscosity ratio in the xylene cold soluble (XCS) fraction of the same.

Accordingly the xylene cold soluble (XCS) fraction of the heterophasic propylene copolymer (HECO) has an intrinsic viscosity determined according to DIN ISO 1628/1 (in decalin at 135° C.) in the range of more than 2.1 to 9.0 dl/g and a comonomer content in the range of 10.0 to 45.0 wt.-%.

More preferably the xylene cold soluble (XCS) fraction of the heterophasic propylene copolymer (HECO) has an intrinsic viscosity determined according to DIN ISO 1628/1 (in decalin at 135° C.) in the range of 2.3 to 8.0 dl/g, still more preferably in the range of 2.3 to 7.5 dl/g, yet more preferably in the range of 2.5 to 7.0 dl/g, like in the range of 4.0 to 7.0 dl/g.

The comonomer content, preferably the ethylene content, of the xylene cold soluble (XCS) fraction preferably is not more than 45.0 wt-%, still more preferably not more than 40.0 wt-%, yet more preferably in the range of 10.0 to 45.0 wt %, still yet more preferably in the range of 12.0 to 40.0 wt-%, even yet more preferably in the range of 14.0 to 35.0 wt-%, like in the range of 14.0 to 30.0 wt-%.

The comonomers of the xylene cold soluble (XCS) fraction are the same as for the total heterophasic propylene copolymer (HECO). Thus the heterophasic propylene copolymer (HECO) comprises monomers copolymerizable with propylene, for example comonomers such as ethylene and/or $C_4$ to $C_{12}$ α-olefins, in particular ethylene and/or $C_4$ to $C_{12}$ α-olefins, e.g. 1-butene and/or 1-hexene. Preferably the xylene cold soluble (XCS) fraction of the heterophasic propylene copolymer (HECO) comprises, especially consists of, monomers copolymerizable with propylene from the group consisting of ethylene, 1-butene and 1-hexene. More specifically the xylene cold soluble (XCS) fraction of the heterophasic propylene copolymer (HECO) comprises—apart from propylene—units derivable from ethylene and/or 1-butene. Thus in an especially preferred embodiment the xylene cold soluble (XCS) fraction of the heterophasic propylene copolymer (HECO) comprises units derivable from ethylene and propylene only.

The amount of the xylene cold soluble (XCS) fraction of the heterophasic propylene copolymer (HECO) preferably is below 45.0 wt.-%, more preferably equal or below 40.0 wt.-%, still more preferably in the range of 15.0 to 45.0 wt.-%, yet more preferably in the range of 20.0 to 42.0 wt.-%, like in the range of 21.0 to 40.0 wt.-% or in the range of 21.0 to 35.0 wt.-%.

The expression "heterophasic propylene copolymer" or "heterophasic" as used in the instant invention indicates that an elastomeric propylene copolymer is (finely) dispersed in a (semi) crystalline polypropylene. In other words the (semi) crystalline polypropylene constitutes a matrix in which the elastomeric propylene copolymer forms inclusions in the matrix, i.e. in the (semi) crystalline polypropylene. Thus the matrix contains (finely) dispersed inclusions being not part of the matrix and said inclusions contain the elastomeric propylene copolymer. The term "inclusion" according to this invention shall preferably indicate that the matrix and the inclusion form different phases within the heterophasic system, said inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly the heterophasic propylene copolymer (HECO) according to this invention comprises a propylene homopolymer (H-PP) acting as a matrix and dispersed therein an elastomeric propylene copolymer (E). Thus the matrix contains (finely) dispersed inclusions being not part of the matrix and said inclusions contain the elastomeric propylene copolymer (E).

The expression polypropylene homopolymer (PP-H) used in the instant invention relates to a polypropylene that consists substantially, i.e. of more than 99.5 wt.-%, still more preferably of at least 99.7 wt.-%, like of at least 99.8 wt.-%, of propylene units. In a preferred embodiment, only propylene units in the polypropylene homopolymer (PP-H) are detectable.

As the propylene homopolymer (H-PP) is nearly xylene cold insoluble and the elastomeric propylene copolymer (E) is predominantly soluble in cold xylene, the properties of xylene cold insoluble fraction (XCI) of the heterophasic propylene copolymer (HECO) and of the propylene homopolymer (H-PP) are quite similar.

Accordingly, the xylene cold insoluble (XCI) of the heterophasic propylene copolymer (HECO) and the propylene homopolymer (H-PP), respectively, preferably have a melt flow rate $MFR_2$ (230° C.) measured according to ISO 1133 in the range of 15 to 400 g/10 min, more preferably in the range of more than 35 to 400 g/10 min, still more preferably in the range of 40 to 300 g/10 min, yet more preferably in the range of 45 to 200 g/10 min, still yet more preferably in the range of 50 to 100 g/10 min.

The propylene homopolymer (H-PP) can be monomodal or multimodal, like bimodal, in its molecular weight fraction.

In case the propylene homopolymer (H-PP) is multimodal, like bimodal, in its molecular weight, it comprises at least two fractions, preferably consist of two fractions, the fractions are a first propylene homopolymer fraction (H-PP1) and a second propylene homopolymer fraction (H-PP2). Preferably the two fractions differ in the melt flow rate $MFR_2$ (230° C.). Accordingly it is appreciated that the first propylene homopolymer fraction (H-PP1) differs by a melt flow rate $MFR_2$ (230° C.) of at least 10 g/10 min, more preferably by at least 20 g/10 min, still more preferably in a range from 10 to 200 g/10 min, yet more preferably in a range from 15 to 150 g/10 min, from the second propylene homopolymer fraction (H-PP2). Preferably the melt flow rate $MFR_2$ (230° C.) of the first propylene homopolymer fraction (H-PP1) is higher than the melt flow rate $MFR_2$ (230° C.) of the second propylene homopolymer fraction (H-PP2).

Preferably the heterophasic propylene copolymer (HECO) fulfills the in-equation (III), more preferably the in-equation (IIIa), the in-equation (IIIb), the in-equation (IIIc), $$\frac{MFR(HPP)}{MFR(HECO)} \geq 3.0 \quad \text{(III)}$$

$$60 \geq \frac{MFR(HPP)}{MFR(HECO)} \geq 3.0 \quad \text{(IIIa)}$$

$$50 \geq \frac{MFR(HPP)}{MFR(HECO)} \geq 4.0 \quad \text{(IIIb)}$$

$$40 \geq \frac{MFR(HPP)}{MFR(HECO)} \geq 4.5 \quad \text{(IIIc)}$$

wherein

MFR(HPP) is the melt flow rate MFR (230° C.) measured according to ISO 1133 of the propylene homopolymer (H-PP) and MFR(HECO) is the melt flow rate MFR (230° C.) measured according to ISO 1133 of the heterophasic propylene copolymer (HECO).

The elastomeric propylene copolymer (E) of the heterophasic propylene copolymer (HECO) mainly influences the properties and amount of the xylene cold soluble (XCS) fraction of the heterophasic propylene copolymer (HECO). Accordingly in a first approximation the properties of the elastomeric propylene copolymer (E) can be equated with the properties of the xylene cold soluble (XCS) fraction of the heterophasic propylene copolymer (HECO). However in preferred embodiments the amount of elastomeric propylene copolymer (E) is higher than the total xylene cold soluble (XCS) content of the heterophasic propylene copolymer (HECO).

Accordingly the amount of elastomeric copolymer (E) of the heterophasic propylene copolymer (HECO) preferably is below 45.0 wt.-%, more preferably equal or below 40.0 wt.-%, still more preferably in the range of 16.0 to 45 wt.-%, yet more preferably in the range of 21.0 to below 43.0 wt.-%.-%, like in the range of 22.0 to 40.0 wt.-% or in the range of 22.0 to 36.0 wt.-%.

The elastomeric propylene copolymer (E) comprises monomers copolymerizable with propylene, for example comonomers such as ethylene and/or $C_4$ to $C_{12}$ α-olefins, in particular ethylene and/or $C_4$ to $C_{12}$ α-olefins, e.g. 1-butene and/or 1-hexene. Preferably the elastomeric propylene copolymer (E) comprises, especially consists of, monomers copolymerizable with propylene from the group consisting of ethylene, 1-butene and 1-hexene. More specifically the elastomeric propylene copolymer (E) comprises—apart from propylene—units derivable from ethylene and/or 1-butene. Thus in an especially preferred embodiment the elastomeric propylene copolymer phase (E) comprises units derivable from ethylene and propylene only, i.e. is a propylene-ethylene rubber (EPR).

The comonomer content, preferably the ethylene content, of the elastomeric propylene copolymer (E) based on the total weight of the elastomeric propylene copolymer (E) preferably is not more than 45.0 wt-%, still more preferably not more than 40.0 wt-%, yet more preferably in the range of 10.0 to 45.0 wt %, still yet more preferably in the range of 12.0 to 40.0 wt-%, even yet more preferably in the range of 14.0 to 35.0 wt-%, like in the range of 14.0 to 30.0 wt-%.

The heterophasic propylene copolymer (HECO) as defined in the instant invention may contain up to 5.0 wt.-% additives (excluding α-nucleating agents), like antioxidants and slip agents as well as antiblocking agents. Preferably the additive content is below 3.0 wt.-%, like below 1.0 wt.-%.

Preferably the heterophasic propylene copolymer (HECO) comprises an α-nucleating agent. Even more preferred the present invention is free of β-nucleating agents. Accordingly, the α-nucleating agent is preferably selected from the group consisting of (i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and
(iv) vinylcycloalkane polymer and vinylalkane polymer (as discussed in more detail below), and
(v) mixtures thereof.

Such additives are generally commercially available and are described, for example, in "Plastic Additives Handbook", 5th edition, 2001 of Hans Zweifel, pages 871 to 873.

Preferably the heterophasic propylene copolymer (HECO) contains up to 5 wt.-% of the α-nucleating agent. In a preferred embodiment, the heterophasic propylene copolymer (HECO) contains not more than 200 ppm, more preferably of 1 to 200 ppm, more preferably of 5 to 100 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl) methylene]-nonitol, vinylcycloalkane polymer, vinylalkane polymer, and mixtures thereof.

It is especially preferred the heterophasic propylene copolymer (HECO) contains a vinylcycloalkane, like vinylcyclohexane (VCH), polymer and/or vinylalkane polymer. In one specific embodiment the heterophasic propylene copolymer (HECO) contains a vinylcycloalkane, like vinylcyclohexane (VCH), polymer and/or vinylalkane polymer. Preferably the vinylcycloalkane is vinylcyclohexane (VCH) polymer is introduced into the heterophasic propylene copolymer (HECO) by the BNT technology.

The heterophasic propylene copolymer (HECO) is preferably obtained by a specific process. Accordingly the heterophasic propylene copolymer (HECO) is preferably obtained by a sequential polymerization process in the first reactor ($1^{st}$ R') and optionally in a second reactor ($2^{nd}$ R') the propylene homopolymer (H-PP) is produced, whereas in the third reactor ($3^{rd}$ R') and optionally in a forth reactor ($4^{th}$ R') the elastomeric propylene copolymer (E) of the heterophasic propylene copolymer (HECO) is obtained.

The term "sequential polymerization process" indicates that the heterophasic propylene copolymer (HECO) is produced in at least two polymerization reactors, preferably in three or four polymerization reactors, connected in series. Accordingly the present process comprises at least a first polymerization reactor ($1^{st}$ R'), an optional second polymerization reactor ($2^{nd}$ R'), a third polymerization reactor ($3^{rd}$ R') and optional a fourth polymerization reactor ($4^{th}$ R'). The term "polymerization reactor" shall indicate that the main polymerization takes place. Thus in case the process consists of three or four polymerization reactors, this definition does not exclude the option that the overall process comprises for instance a pre-polymerization step in a pre-polymerization reactor. The term "consist of" is only a closing formulation in view of the main polymerization reactors.

As stated above in the first ($1^{st}$ R') or in the first two polymerization reactors ($1^{st}$ and $2^{nd}$ R') the matrix, i.e. the propylene homopolymer (H-PP) is produced. In case two polymerization reactors are used for the preparation of the propylene homopolymer (H-PP), in each polymerization reactor a propylene homopolymer fraction (H-PP1) and (H-PP2) is produced which may differ in the melt flow rate as indicated above. Preferably the first propylene homopolymer fraction (H-PP1) is produced in the first polymerization reactor ($1^{st}$ R') whereas the second propylene homopolymer fraction (H-PP2) is produced in the second polymerization reactor ($2^{nd}$ R').

Preferably the weight ratio between the first propylene homopolymer fraction (H-PP1) and second propylene homopolymer fraction (H-PP2) is 20/80 to 80/20, more preferably 30/70 to 70/30, yet more preferably 40/60 to 65/35.

After the first polymerization reactor ($1^{st}$ R') or optional second polymerization reactor ($2^{nd}$ R') the matrix, i.e. the propylene homopolymer (H-PP), of the heterophasic propylene copolymer (HECO), is obtained. This matrix is subsequently transferred into the third polymerization reactor ($3^{rd}$ R') and optional polymerization fourth reactor ($4^{th}$ R') in which the elastomeric propylene copolymer (E) is produced and thus the heterophasic propylene copolymer (HECO) of the instant invention is obtained.

Preferably the weight ratio between the matrix, i.e. the propylene homopolymer (H-PP), and the elastomeric propylene copolymer (E) [(H-PP)/(E)] is 91/9 to 60/40, more preferably 90/10 to below 70/30.

The first polymerization reactor ($1^{st}$ R') is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second polymerization reactor ($2^{nd}$ R'), the third polymerization reactor ($3^{rd}$ R') and fourth polymerization reactor ($4^{th}$ R') are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first polymerization reactor ($1^{st}$ R') is a slurry reactor (SR), like loop reactor (LR), whereas the second polymerization reactor ($2^{nd}$ R'), the third polymerization reactor ($3^{th}$ R') and the optional fourth polymerization reactor ($4^{th}$ R') are gas phase reactors (GPR). Accordingly for the instant process at least two, preferably two or three polymerization reactors, namely a slurry reactor (SR), like loop reactor (LR), a first gas phase reactor (GPR-1), a second gas phase reactor (GPR-2) and optionally a third gas phase reactor (GPR-3) connected in series are used. If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/244749 or in WO 00/68315.

A further suitable slurry-gas phase process is the Spheripol® process of Basell.

Preferably, in the instant process for producing the heterophasic propylene copolymer (HECO), as defined above the conditions for the first polymerization reactor ($1^{st}$ R'), i.e. the slurry reactor (SR), like a loop reactor (LR), may be as follows:

the temperature is within the range of 40° C. to 110° C., preferably between 60° C. and 100° C., like 68 to 95° C., the pressure is within the range of 20 bar to 80 bar, preferably between 40 bar to 70 bar, hydrogen can be added for controlling the molar mass in a manner known per se.

Subsequently, the reaction mixture from the first polymerization reactor ($1^{st}$ R') is transferred to the second polymerization reactor ($2^{nd}$ R'), i.e. gas phase reactor (GPR-1), whereby the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

The condition in the third polymerization reactor ($3^{rd}$ R') and the fourth polymerization reactor ($4^{th}$ R'), preferably in the second gas phase reactor (GPR-2) and third gas phase reactor (GPR-3), are similar to the second reactor ($2^{nd}$ R').

The residence time can vary in the three or four reactor zones.

In one embodiment of the process for producing the heterophasic propylene copolymer (HECO), the residence time the first reactor ($1^{st}$ R'), i.e. the slurry reactor (SR), like a loop reactor (LR), is in the range 0.2 to 4 hours, e.g. 0.3 to 1.5 hours and the residence time in the gas phase reactors will generally be 0.2 to 6.0 hours, like 0.5 to 4.0 hours.

If desired, the polymerization may be effected in a known manner under supercritical conditions in the first polymerization reactor ($1^{st}$ R'), i.e. in the slurry reactor (SR), like in the loop reactor (LR), and/or as a condensed mode in the gas phase reactors (GPR).

Preferably the process comprises also a prepolymerization with the catalyst system, as mentioned below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the heterophasic propylene copolymer (HECO) is obtained by a sequential polymerization process, as described above, in the presence of a catalyst system comprising a Ziegler-Natta catalyst and optionally an external donor, preferably a catalyst system comprising three components, namely as component (i) a Ziegler-Natta procatalyst, and optionally as component (ii) an organometallic cocatalyst and as component (iii) an external donor represented by formula (IIIa) or (IIIb), preferably represented by formula (IIIa), as described above in accordance with the preparation of the first heterophasic propylene copolymer (HECO1).

More preferably the external donor is of formula (IIIa), like dicyclopentyl dimethoxy silane [$Si(OCH_3)_2(cyclo-pentyl)_2$] or diisopropyl dimethoxy silane [$Si(OCH_3)_2(CH(CH_3)_2)_2$].

The additives as stated above are added to the heterophasic propylene copolymer (HECO) preferably by extruding. For mixing/extruding, a conventional compounding or blending apparatus, e.g. a Banbury mixer, a 2-roll rubber mill, Buss-co-kneader or a twin screw extruder may be used. The polymer materials recovered from the extruder are usually in the form of pellets.

Propylene Copolymer (R-PP)

It is one further requirements of the present invention that the polypropylene composition (C) comprises the propylene copolymer (R-PP).

It is preferred that the propylene copolymer (R-PP) before being mixed with the other components mentioned herein comprises as polymer components only the propylene copolymer (R-PP). In other words the propylene copolymer (R-PP) may contain further additives but no other polymer in an amount exceeding 5.0 wt.-% more preferably exceeding 2.5 wt.-%, based on the total weight of the propylene copolymer (R-PP), more preferably based on the polymers present in the propylene copolymer (R-PP).

It is appreciated that the propylene copolymer (R-PP) according to this invention before being mixed with the other components mentioned herein is preferably monophasic. Accordingly, it is preferred that the propylene copolymer (R-PP) before being mixed with the other components mentioned herein does not contain elastomeric (co)polymers forming inclusions as a second phase for improving mechanical properties. A polymer containing elastomeric (co)polymers as insertions of a second phase would by contrast be called heterophasic. The presence of second phases or the so called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Accordingly it is preferred that the propylene copolymer (R-PP) according to this invention has no glass transition temperature below −20° C., preferably below −25° C., more preferably below −30° C.

On the other hand, in one preferred embodiment the propylene copolymer (R-PP) according to this invention has a glass transition temperature in the range of −12 to +2° C., more preferably in the range of −10 to +2° C.

The propylene copolymer (R-PP) according to this invention has a melt flow rate $MFR_2$ (230° C.) measured according to ISO 1133 in the range of 5.0 to 100.0 g/10 min, more preferably in the range of 5.0 to 80.0 g/10 min, still more preferably in the range of 5.0 to 60.0 g/10 min The propylene copolymer (R-PP) comprises apart from propylene also comonomers. Preferably the propylene copolymer (R-PP) comprises apart from propylene a comonomer selected from ethylene, $C_4$ to $C_{12}$ α-olefin and mixtures thereof. Accordingly, the term "propylene copolymer" according to this invention is preferably understood as a polypropylene comprising, preferably consisting of, units derivable from
(a) propylene and
(b) ethylene and/or $C_4$ to $C_{12}$ α-olefins.

Thus, the propylene copolymer (R-PP) according to this invention preferably comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the propylene copolymer (R-PP) according to this invention comprises, especially consists of, monomers copolymerizable with propylene from the group consisting of ethylene, 1-butene and 1-hexene. More specifically the propylene copolymer (R-PP) of this invention comprises—apart from propylene—units derivable from ethylene and/or 1-butene. In a preferred embodiment the propylene copolymer (R-PP) according to this invention comprises units derivable from ethylene and propylene only.

Additionally, it is appreciated that the propylene copolymer (R-PP) preferably has a comonomer content in a very specific range which contributes to the impact strength and the good optical properties. Thus, it is required that the comonomer content of the propylene copolymer (R-PP) is in the range of 1.5 to 8.0 wt.-%, preferably in the range of 1.5 to 6.0 wt.-%, more preferably in the range of 2.0 to 4.5 wt.-%, still more preferably in the range of 2.0 to 3.5 wt.-% and most preferably in the range of 2.5 to 3.5 wt.-%, based on the total weight of the propylene copolymer (R-PP).

Preferably, the propylene copolymer (R-PP) has a melting temperature in the range of 135 to 165° C., preferably in the range of 140 to 160° C., like in the range of 150 to 160° C.

Further it is preferred that the propylene copolymer (R-PP) has a crystallization temperature of at least 110° C., more preferably in the range of 110 to 125° C., still more preferably in the range of 112 to 124° C., like in the range of 117 to 124° C.

Preferably, the propylene copolymer (R-PP) has a xylene cold soluble fraction (XCS) in the range of 2.0 to 25.0 wt.-%, preferably in the range of 2.5 to 20.0 wt.-%, more preferably in the range of 2.5 to 8.0 wt-%.

Preferably the propylene copolymer (R-PP) according to this invention has been produced in the presence of a Ziegler-Natta catalyst. The catalyst influences in particular the microstructure of the polymer. In particular, polypropylenes prepared by using a metallocene catalyst provide a different microstructure compared to polypropylenes prepared by using Ziegler-Natta (ZN) catalysts. The most significant difference is the presence of regio-defects in metallocene-made polypropylenes which is not the case for polypropylenes made by Ziegler-Natta (ZN). The regio-defects can be of three different types, namely 2,1-erythro (2,1e), 2,1-threo (2,1t) and 3,1 defects. A detailed description of the structure and mechanism of formation of regio-defects in polypropylene can be found in Chemical Reviews 2000, 100(4), pages 1316-1327.

The term "2,1 regio defects" as used in the present invention defines the sum of 2,1 erythro regio-defects and 2,1 threo regio-defects.

Accordingly, it is preferred that the propylene copolymer (R-PP) according to this invention has 2,1 regio-defects, like 2,1 erythro regio-defects, of at most 0.4%, more preferably of at most 0.3%, still more preferably of at most 0.2%, determined by $^{13}C$-NMR spectroscopy. In one specific embodiment no 2,1 regio-defects, like 2,1 erythro regio-defects, are detectable for the propylene copolymer (R-PP).

The propylene copolymer (R-PP) preferably comprises at least two polymer fractions, like two or three polymer fraction, all of them being propylene copolymers. Preferably, the propylene copolymer (R-PP) comprises at least two different propylene copolymer fractions, like two different propylene copolymer fractions, wherein further the two propylene copolymer fractions preferably differ in the comonomer content.

In one embodiment, the propylene copolymer (R-PP) consists of a first propylene copolymer fraction (R-PP1) and a second propylene copolymer fraction (R-PP2).

Accordingly, the propylene copolymer (R-PP) is preferably multimodal, like bimodal, in view of the molecular weight distribution and/or the comonomer content distribution.

As will be explained below, the polymer components of the propylene copolymers (R-PP) can be produced in a sequential step process, using reactors in serial configuration and operating at different reaction conditions. As a consequence, each fraction prepared in a specific reactor will have its own molecular weight distribution and/or comonomer content distribution.

When the distribution curves (molecular weight or comonomer content) from these fractions are superimposed to obtain the molecular weight distribution curve or the comonomer content distribution curve of the final polymer, these curves may show two or more maxima or at least be distinctly broadened when compared with curves for the individual fractions. Such a polymer, produced in two or more serial steps, is called bimodal or multimodal, depending on the number of steps.

Accordingly, the propylene copolymer (R-PP) can be multimodal, like bimodal, in view of the comonomer content and/or molecular weight. It is in particular appreciated that the propylene copolymer (R-PP) is multimodal, like bimodal, in view of the comonomer content.

Further, in case the propylene copolymer (R-PP) is of multimodal, like bimodal, character, in particular multimodal, like bimodal, in view of the comonomer content, it is appreciated that the individual fractions are present in amounts influencing the properties of the material. Accordingly it is appreciated that each of these fractions is at least present in the amount of 10.0 wt.-% based on the total weight of the propylene copolymer (R-PP). Accordingly, in case of a bimodal system, in particular in view of the comonomer content, the split of the two fractions is preferably 70/30 to 30/70, more preferably 65/35 to 35/65, like 50/50 to 40/60.

Accordingly, the weight ratio between the first propylene copolymer fraction (R-PP1) and the second propylene copolymer fraction (R-PP2) is preferably 70/30 to 30/70, more preferably 65/35 to 35/65. For example, the weight ratio between the first propylene copolymer fraction (R-PP1) and the second propylene copolymer fraction (R-PP2) is 50/50 to 40/60.

As already indicated above, the comonomers of the first propylene copolymer fraction (R-PP1) and the second propylene copolymer fraction (R-PP2), respectively, which are copolymerizable with propylene are ethylene and/or $C_4$ to $C_{12}$ α-olefins, in particular ethylene and/or $C_4$ to $C_8$ α-olefins, e.g. 1-butene and/or 1-hexene. Preferably, the first propylene copolymer fraction (R-PP1) and second propylene copolymer fraction (R-PP2), respectively, comprise, especially consist of, monomers copolymerizable with propylene from the group consisting of ethylene, 1-butene and 1-hexene. More specifically, the first propylene copolymer fraction (R-PP1) and second propylene copolymer fraction (R-PP2), respectively, comprise—apart from propylene—units derivable from ethylene and/or 1-butene. In a preferred embodiment, the first propylene copolymer fraction (R-PP1) and the second propylene copolymer fraction (R-PP2) comprise the same comonomers, i.e. ethylene only.

It is appreciated that the comonomer content of the first propylene copolymer fraction (R-PP1) and the second propylene copolymer fraction (R-PP2) fulfill a specific in-equation.

Accordingly, it is preferred that the first propylene copolymer fraction (R-PP1) and the second propylene copolymer fraction (R-PP2) fulfill together the in-equation (IV), more preferably in-equation (IVa), still more preferably in-equation (IVb), $$\frac{Co(R-PP2)}{Co(R-PP1)} \geq 1.0, \tag{IV}$$

$$1.0 \leq \frac{Co(R-PP2)}{Co(R-PP1)} \leq 4.0, \tag{IVa}$$

$$1.0 \leq \frac{Co(R-PP2)}{Co(R-PP1)} \leq 3.0 \tag{IVb}$$

wherein
Co (R-PP1) is the comonomer content [wt.-%] of the first propylene copolymer fraction (R-PP1),
Co (R-PP2) is the comonomer content [wt.-%] of the second propylene copolymer fraction (R-PP2).

Additionally or alternatively, it is preferred that the propylene copolymer (R-PP) has higher comonomer content than the first propylene copolymer fraction (R-PP1). Accordingly, the first propylene copolymer fraction (R-PP1) and the propylene copolymer (R-PP) preferably fulfill together the in-equation (V), more preferably in-equation (Va), still more preferably in-equation (Vb), $$\frac{Co(R-PP)}{Co(R-PP1)} \geq 1.0, \tag{V}$$

$$1.0 \leq \frac{Co(R-PP)}{Co(R-PP1)} \leq 3.0, \tag{Va}$$

$$1.0 \leq \frac{Co(R-PP)}{Co(R-PP1)} \leq 2.5 \tag{Vb}$$

wherein
Co (R-PP1) is the comonomer content [wt.-%] of the first propylene copolymer fraction (R-PP1),
Co (R-PP) is the comonomer content [wt.-%] of the propylene copolymer (R-PP).

Accordingly, it is preferred that the first propylene copolymer fraction (R-PP1) of the propylene copolymer (R-PP) has a lower comonomer content than the propylene copolymer (R-PP).

It is preferred that the first propylene copolymer fraction (R-PP1) of the propylene copolymer (R-PP) has a comonomer content in the range of 0.8 to 2.5 wt.-%, preferably in the range of 1.0 to 2.3 wt.-%, more preferably in the range of 1.2 to 2.0 wt.-%, based on the total weight of the first propylene copolymer fraction (R-PP1).

Additionally or alternatively, the second propylene copolymer fraction (R-PP2) of the propylene copolymer (R-PP) has a comonomer content in the range of more than 2.5 to 10.0 wt.-%, preferably in the range of more than 2.5 to 7.0 wt.-%, more preferably in the range of more than 2.5 to 5.0 wt.-%, based on the total weight of the second propylene copolymer fraction (R-PP2).

In one embodiment, the two polymer copolymer fractions of the propylene copolymer (R-PP) the melt flow rate $MFR_2$ (230° C.) of the first propylene copolymer fraction (R-PP1) and the second propylene copolymer fraction (R-PP2) fulfill together in-equation (VI), more preferably inequation (VIa), still more preferably inequation (VIb), $$0.5 \leq \frac{MFR(R-PP1)}{MFR(R-PP2)} \geq 1.5 \tag{VI}$$

$$0.8 \leq \frac{MFR(R-PP1)}{MFR(R-PP2)} \leq 1.2 \tag{VIa}$$

$$0.9 \leq \frac{MFR(R-PP1)}{MFR(R-PP2)} \leq 1.1 \tag{VIb}$$

wherein
MFR (R-PP1) is the melt flow rate $MFR_2$ (230° C.) [g/10 min] of the first propylene copolymer fraction (R-PP1),
MFR (R-PP2) is the melt flow rate $MFR_2$ (230° C.) [g/10 min] of the second propylene copolymer fraction (R-PP2).

Additionally or alternatively, the melt flow rate $MFR_2$ (230° C.) of the first propylene copolymer fraction (R-PP1) and the melt flow rate $MFR_2$ (230° C.) of the second propylene copolymer fraction (R-PP2) differ by no more than 5.0 g/10 min, more preferably by no more than 3.0 g/10 min and most preferably by no more than 2.0 g/10 min. In one embodiment, the melt flow rate $MFR_2$ (230° C.) of the first propylene copolymer fraction (R-PP1) and the melt flow rate $MFR_2$ (230° C.) of the second propylene copolymer fraction (R-PP2) are the same.

It is thus appreciated that the melt flow rate $MFR_2$ (230° C.) of the first propylene copolymer fraction (R-PP1) and the melt flow rate $MFR_2$ (230° C.) of the propylene copolymer (R-PP) differ by no more than 5.0 g/10 min, more preferably by no more than 3.0 g/10 min and most preferably by no more than 2.0 g/10 min. In one embodiment, the melt flow rate $MFR_2$ (230° C.) of the first propylene copolymer fraction (R-PP1) and the melt flow rate $MFR_2$ (230° C.) of the propylene copolymer (R-PP) are the same.

It is thus preferred that the propylene copolymer (R-PP) comprises, preferably consists of, a first propylene copolymer fraction (R-PP1) and a second propylene copolymer fraction (R-PP2), wherein further the first propylene copolymer fraction (R-PP1) and the second propylene copolymer fraction (R-PP2) differ in the comonomer content and the melt flow rate $MFR_2$ (230° C.) is the same.

The propylene copolymer (R-PP) as defined in the instant invention may contain up to 5.0 wt.-% additives, like α-nucleating agents and antioxidants, as well as slip agents and antiblocking agents. Preferably the additive content (without α-nucleating agents) is below 3.0 wt.-%, like below 1.0 wt.-%, based on the total weight of the propylene copolymer (R-PP).

Preferably the propylene copolymer (R-PP) comprises an α-nucleating agent. Even more preferred the present invention is free of β-nucleating agents. The α-nucleating agent is preferably selected from the group consisting of (i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis (4, 6,-di-tert-butylphenyl) phosphate or aluminium-hydroxy-bis[2,2'-methylene-bis(4,6-di-t-butylphenyl)phosphate], and
(iv) vinylcycloalkane polymer and vinylalkane polymer (as discussed in more detail below), and
(v) mixtures thereof.

Such additives are generally commercially available and are described, for example, in "Plastic Additives Handbook", 5th edition, 2001 of Hans Zweifel.

Preferably the propylene copolymer (R-PP) contains up to 2.0 wt.-% of the α-nucleating agent. In a preferred embodiment, the propylene copolymer (R-PP) contains not more than 2000 ppm, more preferably of 1 to 2000 ppm, more preferably of 5 to 1500 ppm of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene) sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof.

Preferably, it is desired that the propylene copolymer (R-PP) shows good impact behavior. Accordingly, it is appreciated that the propylene copolymer (R-PP) has Charpy notched impact strength at +23° C. of at least 4.0 kJ/m$^2$, more preferably in the range of 4.0 to 15.0 kJ/m$^2$, still more preferably in the range of 5.0 to 12.0 kJ/m$^2$.

Further, also the tensile modulus of the propylene copolymer (R-PP) should be rather high. It is preferred that the tensile modulus of the propylene copolymer (R-PP) is at least 800 MPa, more preferably in the range of 900 to 1,800 MPa, even more preferably of 1,000 to 1,600 MPa, still more preferably in the range of 1,000 to 1,500 MPa.

As already indicated above, the propylene copolymer (R-PP) according to this invention is preferably produced in a sequential polymerization process in the presence of a Ziegler-Natta catalyst as defined below.

Accordingly it is preferred that the propylene copolymer (R-PP) is produced in the presence of (a) a Ziegler-Natta catalyst (ZN-C) comprising a titanium compound (TC) having at least one titanium-halogen bond, and an internal donor (ID), both supported on a magnesium halide,
(b) a co-catalyst (Co), and
(c) an external donor (ED), wherein (i) the internal donor (ID) comprises at least 80 wt.-% of a succinate; and
(ii) the molar-ratio of co-catalyst (Co) to external donor (ED) [Co/ED] is 10 to 45.

Preferably the propylene copolymer (R-PP) is produced in a sequential polymerization process comprising at least two polymerization reactors (R1) and (R2), in the first polymerization reactor (R1) the first propylene copolymer fraction (R-PP1) is produced and subsequently transferred into the second polymerization reactor (R2), in the second polymerization reactor (R2) the second propylene copolymer fraction (R-PP2) is produced in the presence of the first propylene copolymer fraction (R-PP1).

The term "sequential polymerization system" indicates that the propylene copolymer (R-PP) is produced in at least two polymerization reactors connected in series. Accordingly the present polymerization system comprises at least a first polymerization reactor (R1) and a second polymerization reactor (R2), and optionally a third polymerization reactor (R3). The term "polymerization reactor" shall indicate that the main polymerization takes place. Thus, in case the process consists of two polymerization reactors, this definition does not exclude the option that the overall system comprises for instance a pre-polymerization step in a pre-polymerization reactor. The term "consist of" is only a closing formulation in view of the main polymerization reactors.

Preferably, one, more preferably none, of the polymerization reactors (R1) and (R2) and optional third polymerization reactor (R3) is a gas phase reactor (GPR). A gas phase reactor (GPR) according to this invention is preferably a fluidized bed reactor, a fast fluidized bed reactor or a settled bed reactor or any combination thereof.

Accordingly, the polymerization reactors (R1) and (R2) and the optional third polymerization reactor (R3) are preferably slurry reactors (SR) and can be any continuous or simple stirred batch tank reactor or loop reactor operating in bulk or slurry. In one embodiment, the term "bulk" means a polymerization in a reaction medium that comprises of at least 60% (w/w) monomer. According to the present invention the slurry reactor (SR) is preferably a (bulk) loop reactor (LR). For example, the polymerization reactors (R1) and (R2) and the optional third polymerization reactor (R3) are preferably loop reactors (LR), i.e. first loop reactor (LR1), second loop reactor (LR2) and optionally third loop reactor (LR3). Accordingly, the average concentration of propylene copolymer (R-PP), i.e. the first fraction ($1^{st}$ F) of the propylene copolymer (R-PP) (i.e. the first propylene copolymer fraction (R-PP1)), in the polymer slurry within the first loop reactor (LR1) is typically from 15.0 wt.-% to 55.0 wt.-%, based on the total weight of the polymer slurry within the first loop reactor (LR1). In one preferred embodiment of the present invention, the average concentration of the first propylene copolymer fraction (R-PP1) in the polymer slurry within the first loop reactor (LR1) is from 20.0 wt.-% to 55.0 wt.-% and more preferably from 25.0 wt.-% to 52.0 wt.-%, based on the total weight of the polymer slurry within the first loop reactor (LR1).

Preferably, the propylene copolymer of the first polymerization reactor (R1), i.e. the first propylene copolymer fraction (R-PP1), more preferably the polymer slurry of the loop reactor (LR1) containing the first propylene copolymer fraction (R-PP1), is directly fed into the second polymerization reactor (R2), i.e. into the second loop reactor (LR2), without a flash step between the stages. This kind of direct feed is described in EP 887379 A, EP 887380 A, EP 887381 A and EP 991684 A. By "direct feed" is meant a process wherein the content of the first polymerization reactor (R1), i.e. of the loop reactor (LR1), the polymer slurry comprising the first propylene copolymer fraction (R-PP1), is led directly to the next stage polymerization reactor (R2), i.e. the loop reactor (LR2).

Alternatively, the propylene copolymer of the first polymerization reactor (R1), i.e. the first propylene copolymer fraction (R-PP1), more preferably polymer slurry of the loop reactor (LR1) containing the first propylene copolymer fraction (R-PP1), may be also directed into a flash step or through a further concentration step before fed into the second polymerization reactor (R2), i.e. into the loop reactor (LR2). Accordingly, this "indirect feed" refers to a process wherein the content of the first polymerization reactor (R1), of the loop reactor (LR1), i.e. the polymer slurry, is fed into the second polymerization reactor (R2), into the second loop reactor (LR2), via a reaction medium separation unit and the reaction medium as a gas from the separation unit.

In case one of the polymerization reactors (R1) and (R2) and optional third polymerization reactor (R3) is a gas phase reactor (GPR), preferably the second polymerization reactor (R2), and any subsequent reactor, for instance the third polymerization reactor (R3), are preferably gas phase reactors (GPRs). Such gas phase reactors (GPR) can be any mechanically mixed or fluid bed reactors. Preferably, the gas phase reactors (GPRs) comprise a mechanically agitated fluid bed reactor with gas velocities of at least 0.2 m/sec. Thus, it is appreciated that the gas phase reactor is a fluidized bed type reactor preferably with a mechanical stirrer.

In one preferred embodiment, the first polymerization reactor (R1) as well as the second polymerization reactor (R2) and any optional subsequent reactor, like the third polymerization reactor (R3) are slurry reactors (SR), like loop reactors (LR). If needed prior to the first slurry reactor (SR1) a pre-polymerization reactor is placed.

The Ziegler-Natta catalyst (ZN-C) is fed into the first polymerization reactor (R1) and is transferred with the polymer (slurry) obtained in the first polymerization reactor (R1) into the subsequent reactors. If the process covers also a pre-polymerization step it is preferred that the Ziegler-Natta catalyst (ZN-C) is fed in the pre-polymerization reactor. Subsequently the pre-polymerization product containing the Ziegler-Natta catalyst (ZN-C) is transferred into the first polymerization reactor (R1).

Especially good results are achieved in case the temperature in the reactors is carefully chosen.

Accordingly it is preferred that the operating temperature in the first polymerization reactor (R1) is in the range of 70 to 85° C., more preferably in the range of 75 to 85° C., still more preferably in the range of 77 to 83° C., like in the range of 78 to 82° C., i.e. 80° C.

Alternatively or additionally to the previous paragraph it is preferred that the operating temperature in the second polymerization reactor (R2) and optional in the third polymerization reactor (R3) is in the range of 75 to 95° C., more preferably in the range of 78 to 92° C.

Preferably the operating temperature in the second polymerization reactor (R2) is equal or higher to the operating temperature in the first polymerization reactor (R1). Accordingly it is preferred that the operating temperature (a) in the first polymerization reactor (R1) is in the range of 70 to 85° C., more preferably in the range of 75 to 85° C., still more preferably in the range of 77 to 83° C., like in the range of 78 to 82° C., i.e. 80° C., and (b) in the second polymerization reactor (R2) is in the range of 75 to 95° C., more preferably in the range of 78 to 92° C., still more preferably in the range of 78 to 88° C., with the proviso that the operating temperature in the second polymerization reactor (R2) is equal or higher to the operating temperature in the first polymerization reactor (R1).

Still more preferably the operating temperature of the third polymerization reactor (R3) —if present—is higher than the operating temperature in the first polymerization reactor (R1). In one specific embodiment the operating temperature of the third polymerization reactor (R3)—if present—is higher than the operating temperature in the first polymerization reactor (R1) and in the second polymerization reactor (R2). Accordingly, it is preferred that the operating temperature (a) in the first polymerization reactor (R1) is in the range of 70 to 85° C., more preferably in the range of 75 to 85° C., still more preferably in the range of 77 to 83° C., like in the range of 78 to 82° C., i.e. 80° C., (b) in the second polymerization reactor (R2) is in the range of 75 to 95° C., more preferably in the range of 78 to 92° C., still more preferably in the range of 78 to 88° C., and (c) in the third polymerization reactor (R3)—if present—is in the range of 75 to 95° C., more preferably in the range of 80 to 95° C., still more preferably in the range of 85 to 92° C., with the proviso that the operating temperature in the second polymerization reactor (R2) is equal or higher to the operating temperature in the first polymerization reactor (R1) and with the proviso that the third polymerization reactor (R3) is higher than the operating temperature in the first polymerization reactor (R1), preferably is higher than the operating temperature in the first polymerization reactor (R1) and in the second polymerization reactor (R2).

Typically the pressure in the first polymerization reactor (R1) as well as the second polymerization reactor (R2) and optionally in any subsequent polymerization reactor, preferably in the loop reactors (LR), is in the range of from 20 to 80 bar, preferably 30 to 70 bar, like 35 to 65 bar.

Preferably hydrogen is added in each polymerization reactor in order to control the molecular weight, i.e. the melt flow rate $MFR_2$.

Preferably the average residence time is rather long in the polymerization reactors (R1) and (R2). In general, the average residence time ($\tau$) is defined as the ratio of the reaction volume ($V_R$) to the volumetric outflow rate from the reactor ($Q_o$) (i.e. $V_R/Q_o$), i.e $\tau=V_R/Q_o$ [tau=$V_R/Q_o$]. In case of a loop reactor the reaction volume ($V_R$) equals to the reactor volume.

Accordingly the average residence time ($\tau$) in the first polymerization reactor (R1) is preferably at least 20 min, more preferably in the range of 20 to 45 min, still more preferably in the range of 25 to 42 min, like in the range of 28 to 40 min, and/or the average residence time ($\tau$) in the second polymerization reactor (R2) is preferably at least 90 min, more preferably in the range of 90 to 220 min, still more preferably in the range of 100 to 210 min, yet more preferably in the range of 105 to 200 min, like in the range of 105 to 190 min. Preferably the average residence time ($\tau$) in the third polymerization reactor (R3)—if present—is preferably at least 30 min, more preferably in the range of 30 to 90 min, still more preferably in the range of 40 to 80 min, like in the range of 50 to 80 min.

Further it is preferred that the average residence time ($\tau$) in the total sequential polymerization system, more preferably that the average residence time ($\tau$) in the first (R1) second polymerization reactors (R2) and optional third polymerization reactor (R3) together, is at least 160 min, more preferably at least 180 min, still more preferably in the range of 160 to 260 min, more preferably in the range of 180 to 240 min, still more preferably in the range of 190 to 230 min, yet more preferably in the range of 200 to 225 min.

As mentioned above the instant process can comprises in addition to the (main) polymerization of the propylene copolymer (R-PP) in the at least two polymerization reactors (R1, R3 and optional R3) prior thereto a pre-polymerization in a pre-polymerization reactor (PR) upstream to the first polymerization reactor (R1).

In the pre-polymerization reactor (PR) a polypropylene (Pre-PP) is produced. The pre-polymerization is conducted in the presence of the Ziegler-Natta catalyst (ZN-C). According to this embodiment the Ziegler-Natta catalyst (ZN-C), the co-catalyst (Co), and the external donor (ED) are all introduced to the pre-polymerization step. However, this shall not exclude the option that at a later stage for instance further co-catalyst (Co) is added in the polymerization process, for instance in the first polymerization reactor (R1). In one embodiment the Ziegler-Natta catalyst (ZN-C), the co-catalyst (Co), and the external donor (ED) are only added in the pre-polymerization reactor (PR), if a pre-polymerization is applied.

The pre-polymerization reaction is typically conducted at a temperature of 0 to 60° C., preferably from 15 to 50° C., and more preferably from 20 to 45° C.

The pressure in the pre-polymerization reactor is not critical but must be sufficiently high to maintain the reaction mixture in liquid phase. Thus, the pressure may be from 20 to 100 bar, for example 30 to 70 bar.

In a preferred embodiment, the pre-polymerization is conducted as bulk slurry polymerization in liquid propylene, i.e. the liquid phase mainly comprises propylene, with optionally inert components dissolved therein. Furthermore, according to the present invention, an ethylene feed is employed during pre-polymerization as mentioned above.

It is possible to add other components also to the pre-polymerization stage. Thus, hydrogen may be added into the pre-polymerization stage to control the molecular weight of the polypropylene (Pre-PP) as is known in the art. Further, antistatic additive may be used to prevent the particles from adhering to each other or to the walls of the reactor.

The precise control of the pre-polymerization conditions and reaction parameters is within the skill of the art.

Due to the above defined process conditions in the pre-polymerization, preferably a mixture (MI) of the Ziegler-Natta catalyst (ZN-C) and the polypropylene (Pre-PP) produced in the pre-polymerization reactor (PR) is obtained. Preferably the Ziegler-Natta catalyst (ZN-C) is (finely) dispersed in the polypropylene (Pre-PP). In other words, the Ziegler-Natta catalyst (ZN-C) particles introduced in the pre-polymerization reactor (PR) split into smaller fragments which are evenly distributed within the growing polypropylene (Pre-PP). The sizes of the introduced Ziegler-Natta catalyst (ZN-C) particles as well as of the obtained fragments are not of essential relevance for the instant invention and within the skilled knowledge.

As mentioned above, if a pre-polymerization is used, subsequent to said pre-polymerization, the mixture (MI) of the Ziegler-Natta catalyst (ZN-C) and the polypropylene (Pre-PP) produced in the pre-polymerization reactor (PR) is transferred to the first polymerization reactor (R1). Typically the total amount of the polypropylene (Pre-PP) in the final propylene copolymer (R-PP) is rather low and typically not more than 5.0 wt.-%, more preferably not more than 4.0 wt.-%, still more preferably in the range of 0.5 to 4.0 wt.-%, like in the range 1.0 of to 3.0 wt.-%.

In case that pre-polymerization is not used, propylene and the other ingredients such as the Ziegler-Natta catalyst (ZN-C) are directly introduced into the first polymerization reactor (R1).

Accordingly the process according the instant invention comprises the following steps under the conditions set out above (a) in the first polymerization reactor (R1), i.e. in a loop reactor (LR1), propylene and a comonomer being ethylene and/or a $C_4$ to $C_{12}$ α-olefin, preferably propylene and ethylene, are polymerized obtaining a first propylene copolymer fraction (R-PP1) of the propylene copolymer (R-PP), (b) transferring said first propylene copolymer fraction (R-PP1) to a second polymerization reactor (R2), i.e. in a loop reactor (LR2), (c) in the second polymerization reactor (R2) propylene and a comonomer being ethylene and/or a $C_4$ to $C_{12}$ α-olefin, preferably propylene and ethylene, are polymerized in the presence of the first propylene copolymer fraction (R-PP1) obtaining a second propylene copolymer fraction (R-PP2) of the propylene copolymer (R-PP), said first propylene copolymer fraction (R-PP1) and said second propylene copolymer fraction (R-PP2) form the propylene copolymer (R-PP).

In the following the used catalyst is defined in more detail.

Preferably component (i) is a Ziegler-Natta procatalyst which contains a trans-esterification product of a lower alcohol and a phthalic ester.

The procatalyst used according to the invention is prepared by a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

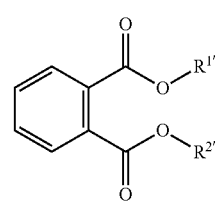

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2$*nROH, wherein R is methyl or ethyl, preferably ethyl, and n is 1 to 6, is contacting with TiCl$_4$ to form a titanised carrier, followed by the steps of adding to said titanised carrier
(i) a dialkylphthalate of formula (I) with $R^{1'}$ and $R^{2'}$ being independently at least a C$_5$-alkyl, like at least a C$_8$-alkyl,
or preferably
(ii) a dialkylphthalate of formula (I) with $R^{1'}$ and $R^{2'}$ being the same and being at least a C$_5$-alkyl, like at least a C$_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product, subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

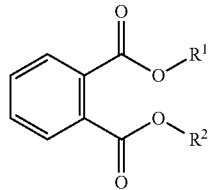

(II)

with $R^1$ and $R^2$ being methyl or ethyl, preferably ethyl, the dialkylphthalat of formula (II) being the internal donor and
recovering said transesterification product as the procatalyst composition (component (i)).

The adduct of the formula MgCl$_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the propylene copolymer (R-PP), according to the invention the catalyst system used preferably comprises in addition to the special Ziegler-Natta procatalyst an organometallic cocatalyst as component (ii).

Accordingly, it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (Iamb). Formula (IIIa) is defined by

$$Si(OCH_3)_2R_2^5 \qquad (IIIa)$$

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (Iamb) is defined by

$$Si(OCH_2CH_3)_3(NR^xR^y) \qquad (Iamb)$$

wherein $R^x$ and $R^y$ can be the same or different a represent a hydrocarbon group having 1 to 12 carbon atoms.

$R^x$ and $R^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that $R^x$ and $R^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both $R^x$ and $R^y$ are the same, yet more preferably both $R^x$ and $R^y$ are an ethyl group.

More preferably the external donor of formula (Iamb) is diethylaminotriethoxysilane.

More preferably the external donor is selected from the group consisting of diethylaminotriethoxysilane [Si(OCH$_2$CH$_3$)$_3$(N(CH$_2$CH$_3$)$_2$)], dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$] and mixtures thereof. Most preferably the external donor is dicyclopentyl dimethoxy silane [Si(OCH$_3$)$_2$(cyclo-pentyl)$_2$].

If desired the Ziegler-Natta procatalyst is modified by polymerizing a vinyl compound in the presence of the catalyst system, comprising the special Ziegler-Natta procatalyst (component (i)), the external donor (component (iii)) and optionally the cocatalyst (component (ii)), wherein the vinyl compound has the formula:

$$CH_2=CH-CHR^3R^4$$

wherein R³ and R⁴ together form a 5- or 6-membered saturated, unsaturated or aromatic ring or independently represent an alkyl group comprising 1 to 4 carbon atoms. The so modified catalyst is used for the preparation of the propylene copolymer, i.e. of the propylene copolymer (R-PP), according to this invention.

Mineral Filler (F)

A further essential component of the polymer composition according to the present invention is the mineral filler (F).

Preferably the mineral filler (F) is selected from the group consisting of talcum, wollastonite, caolin and mica.

In one embodiment of the present invention, the mineral filler (F) is talc.

The mineral filler (F) preferably has an average particle size d50 in the range of 0.5 to 20.0 μm, more preferably in the range of 0.75 to 15.0 μm, still more preferably in the range of 0.75 to 10.0 μm.

Typically, the mineral filler (F) has a cutoff particle size d95 [mass percent] of equal or below 30.0 μm, more preferably in the range from 1.5 to 30.0 μm, still more preferably in the range from 2.0 to 25.0 μm.

Additionally or alternatively, the mineral filler (F) has a BET surface area in the range from 1.0 to 50.0 m²/g, more preferably in the range from 5.0 to 40.0 m²/g, still more preferably in the range from 10.0 to 30.0 m²/g.

It is preferred that the mineral filler (F) is present in a specific weight ratio compared to the propylene copolymer (R-PP) in the polypropylene composition (C).

For example, the weight ratio of the total amount of the heterophasic propylene copolymer (HECO) and the propylene copolymer (R-PP) to the mineral filler (F) [(HECO+RPP)/F] is from 5.0:1.0 to 1.5:1.0. Preferably, the weight ratio of propylene copolymer (R-PP) to the mineral filler (F) [R-PP/F] is from 4.0:1.0 to 1.5:1.0, more preferably from 3.0:1.0 to 1.5:1.0 and most preferably from 3.0:1.0 to 2.0:1.0.

Articles and Uses According to the Invention

It is appreciated that the instant polypropylene composition (C) is used to enhance paint adhesion of a molded article, preferably enhance paint adhesion of an injection molded article. It is especially preferred that the instant polypropylene composition (C) is used to paint adhesion of an injection molded article such as an automotive article, i.e. of an exterior or interior automotive article.

Preferably the polypropylene composition (C) is used to keep the average failed area, which is a measure of paint adhesion, of (injection) molded articles, preferably of automotive (injection) molded articles, such as exterior or interior automotive (injection) molded articles, equal or below 90 mm², more preferably in the range of 5 to equal or below 90 mm², still more preferably in the range of 10 to 70 mm², yet more preferably in the range of 15 to 65 mm². The measuring method for the average failed area is provided in the example section.

Accordingly, it is to be noted that the (injection) molded articles prepared from the polypropylene composition (C) as defined herein shows a good stiffness/impact balance and high paint adhesion. Furthermore, the high paint adhesion is obtained without the use of primers.

In a preferred embodiment the polypropylene composition (C) as defined herein is part of the (injection) molded article, i.e. of the (interior or exterior) automotive article when used for enhancing paint adhesion.

In view of the very good results obtained, the present invention is not only directed to the polypropylene composition (C) as defined herein to enhance paint adhesion, but also to an article in which the polypropylene composition (C) is part of it.

Accordingly the present invention is additionally directed to an article, like an automotive article, comprising the polypropylene composition (C) as defined herein.

The term "automotive article" used in the instant invention indicates that it is a formed three-dimensional article for the interior or exterior of automotives typically made by injection molding. Typical automotive articles are bumpers, side trims, step assists, body panels, rocker panels, spoilers, dash boards, interior trims and the like. The term "exterior" indicates that the article is not part of the car interior but part of the car's exterior. Accordingly, preferred exterior automotive articles are selected from the group consisting of bumpers, side trims, step assists, body panels, and spoilers. In contrast thereto, the term "interior" indicates that the article is part of the car interior but not part of the car's exterior. Accordingly, preferred interior automotive articles are selected from the group consisting of rocker panels, dash boards and interior trims.

Preferably the automotive article, i.e. the exterior automotive article, comprises equal or more than 80.0 wt.-%, more preferably equal or more than 90.0 wt.-%, yet more preferably equal or more than 95.0 wt.-%, still more preferably equal or more than 99.0 wt.-%, still yet more preferably consists, of the polypropylene composition (C).

For mixing the individual components of the instant polypropylene composition (C), a conventional compounding or blending apparatus, e.g. a Branbury mixer, a 2-roll rubber mill, Buss-co-kneader or a twin screw extruder may be used. The polymer material recovered from the extruder are usually in the form of pellets. These pellets are then preferably further processed, e.g. by injection molding to generate the articles, i.e. the (interior or exterior) automotive articles.

The present invention will now be described in further detail by the examples provided below.

EXAMPLES

A. Measuring Methods

The following definitions of terms and determination methods apply for the above general description of the invention as well as to the below examples unless otherwise defined. The following definitions of terms and determination methods apply for the above general description of the invention as well as to the below examples unless otherwise defined. Calculation of comonomer content of the second propylene copolymer fraction (R-PP2):

$$\frac{C(PP) - w(PP1) \times C(PP1)}{w(PP2)} = C(PP2)$$

wherein
w(PP1) is the weight fraction [in wt.-%] of the first propylene copolymer fraction (R-PP1),
w(PP2) is the weight fraction [in wt.-%] of the second propylene copolymer fraction (R-PP2),
C(PP1) is the comonomer content [in wt.-%] of the first propylene copolymer fraction (R-PP1),
C(PP) is the comonomer content [in wt.-%] of the propylene copolymer (R-PP),
C(PP2) is the calculated comonomer content [in wt.-%] of the second propylene copolymer fraction (R-PP2).

Calculation of comonomer content of the elastomeric propylene copolymer (E):

$$\frac{C(PP) - w(PP1) \times C(PP1)}{w(PP2)} = C(PP2)$$

wherein
w(PP1) is the weight fraction [in wt.-%] of the propylene homopolymer (H-PP),
w(PP2) is the weight fraction [in wt.-%] of the elastomeric propylene copolymer (E),
C(PP1) is the comonomer content [in wt.-%] of the first propylene copolymer fraction (R-PP1),
C(PP) is the comonomer content [in wt.-%] of the heterophasic propylene copolymer (HECO),
C(PP2) is the calculated comonomer content [in wt.-%] of the elastomeric propylene copolymer (E).

Calculation of melt flow rate $MFR_2$ (230° C.) of the second propylene copolymer fraction (R-PP2):

$$MFR(PP2) = 10^{\left[\frac{log(MFR(PP))-w(PP1)\times log(MFR(PP1))}{w(PP2)}\right]}$$

wherein
w(PP1) is the weight fraction [in wt.-%] of the first propylene copolymer fraction (R-PP1),
w(PP2) is the weight fraction [in wt.-%] of the second propylene copolymer fraction (R-PP2),
MFR(PP1) is the melt flow rate $MFR_2$ (230° C.) [in g/10 min] of the first propylene copolymer fraction (R-PP1),
MFR(PP) is the melt flow rate $MFR_2$ (230° C.) [in g/10 min] of the propylene copolymer (R-PP),
MFR(PP2) is the calculated melt flow rate $MFR_2$ (230° C.) [in g/10 min] of the second propylene copolymer fraction (R-PP2).

Calculation of melt flow rate $MFR_2$ (230° C.) of the second propylene homopolymer fraction (H-PP2):

$$MFR(PP2) = 10^{\left[\frac{log(MFR(PP))-w(PP1)\times log(MFR(PP1))}{w(PP2)}\right]}$$

wherein
w(PP1) is the weight fraction [in wt.-%] of the first propylene homopolymer fraction (H-PP1),
w(PP2) is the weight fraction [in wt.-%] of the second propylene homopolymer fraction (H-PP2),
MFR(PP1) is the melt flow rate $MFR_2$ (230° C.) [in g/10 min] of the first propylene homopolymer fraction (H-PP),
MFR(PP) is the melt flow rate $MFR_2$ (230° C.) [in g/10 min] of the propylene homopolymer (H-PP),
MFR(PP2) is the calculated melt flow rate $MFR_2$ (230° C.) [in g/10 min] of the second propylene homopolymer fraction (H-PP2).

Quantification of Copolymer Microstructure and Comonomer Content by NMR Spectroscopy Quantitative nuclear-magnetic resonance (NMR) spectroscopy was used to quantify the comonomer content of the polymers.

Quantitative $^{13}C\{^1H\}$ NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent as described in G. Singh, A. Kothari, V. Gupta, Polymer Testing 2009, 28(5), 475. To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme as described in Z. Zhou, R. Kuemmerle, X. Qiu, D. Redwine, R. Cong, A. Taha, D. Baugh, B. Winniford, J. Mag. Reson. 187 (2007) 225 and V. Busico, P. Carbonniere, R. Cipullo, C. Pellecchia, J. Severn, G. Talarico, Macromol. Rapid Commun. 2007, 28, 1128. A total of 6144 (6k) transients were acquired per spectra. Quantitative $^{13}C\{^1H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present.

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

Characteristic signals corresponding to the incorporation of ethylene were observed (as described in Cheng, H. N., Macromolecules 1984, 17, 1950) and the comonomer fraction calculated as the fraction of ethylene in the polymer with respect to all monomer in the polymer.

The comonomer fraction was quantified using the method of W-J. Wang and S. Zhu, Macromolecules 2000, 33 1157, through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

The mole percent comonomer incorporation was calculated from the mole fraction.

The weight percent comonomer incorporation was calculated from the mole fraction.

Number Average Molecular Weight ($M_n$), Weight Average Molecular Weight ($M_w$) and Polydispersity (Mw/Mn) are determined by Gel Permeation Chromatography (GPC) according to the following method:

The weight average molecular weight Mw and the polydispersity (Mw/Mn), wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methylphenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterized broad polypropylene standards. All samples were prepared by dissolving 5-10 mg of polymer in 10 mL (at 160° C.) of stabilized TCB (same as mobile phase) and keeping for 3 hours with continuous shaking prior sampling in into the GPC instrument.

The glass transition temperature Tg is determined by dynamic mechanical analysis according to ISO 6721-7. The measurements are done in torsion mode on compression moulded samples (40×10×1 mm$^3$) between −100° C. and +150° C. with a heating rate of 2° C./min and a frequency of 1 Hz.

Density is measured according to ISO 1183-187. Sample preparation is done by compression moulding in accordance with ISO 1872-2:2007.

MFR$_2$ (230° C.) is measured according to ISO 1133 (230° C., 2.16 kg load).

MFR$_2$ (190° C.) is measured according to ISO 1133 (190° C., 2.16 kg load).

Intrinsic viscosity is measured according to DIN ISO 1628/1, October 1999 (in Decalin at 135° C.).

Xylene Cold Soluble Fraction (XCS Wt %)

The xylene cold soluble fraction (XCS) is determined at 23° C. according to ISO 6427.

Melting temperature $T_m$, crystallization temperature $T_c$, is measured with Mettler TA820 differential scanning calorimetry (DSC) on 5-10 mg samples. Both crystallization and melting curves were obtained during 10° C./min cooling and heating scans between 30° C. and 225° C. Melting and crystallization temperatures were taken as the peaks of endotherms and exotherms.

Also the melt- and crystallization enthalpy (Hm and Hc) were measured by the DSC method according to ISO 11357-1.

Median particle size d50 (Sedimentation) is calculated from the particle size distribution [mass percent] as determined by gravitational liquid sedimentation according to ISO 13317-3 (Sedigraph).

Tensile Modulus; Tensile stress at break; Tensile stress at yield; Tensile strain at yield; Tensile strength; Tensile strain at tensile strength; Tensile strain at break were measured according to ISO 527-2 (cross head speed=50 mm/min; 23° C.) using injection molded specimens as described in EN ISO 1873-2 (dog bone shape, 4 mm thickness).

Charpy impact test: The Charpy notched impact strength (Charpy NIS) is measured according to ISO 179-1/1eA/DIN 53453 at 23° C., and −20° C., using injection molded bar test specimens of 80×10×4 mm$^3$ mm$^3$ prepared in accordance with ISO 294-1:1996.

Cutoff particle size d95 (Sedimentation) is calculated from the particle size distribution [mass percent] as determined by gravitational liquid sedimentation according to ISO 13317-3 (Sedigraph).

Surface area: BET with N$_2$ gas according to DIN 66131/2, apparatus Micromeritics Tristar 3000: sample preparation at a temperature of 50° C., 6 hours in vacuum.

Sample Preparation:

The maximum temperature of the melt was set to 240° C. The following conditions for the injection molding of test panels (80 mm×150 mm×2 mm) were used: melt temperature=240° C., mold temperature=50° C., and flow front velocity 100 mm/s.

The test panels were painted in a usual way with a standard laboratory painting process, which was composed of three consecutive steps (Power wash process, flame pre-treatment and painting process) and performed according Borealis QM work instructions (QMAA 3-430-04, available from Borealis). The panels were first purified in a simulated power wash process (pH 10, 30 bar, 30° C.). After being washed with desalinated water the panels were dried at room temperature.

For activating the panel surface, the burner Hill/Asis Brenner S220 available from Herbert Arnold GmbH, Germany was used. An air/methane ratio of 11:1 at a volume flowrate of 310:28.2 was adjusted for the flame pretreatment. The panels were pulled ahead on a skid with 800 mm/s and a distance from the flame of 8 cm.

A two layer paint systems consisting of a base coat and a clear coat was applied for painting consisting of a base coat paint and a clear coat.

As base coat paint HBL schwarz II (black waterborne base coat) of BASF SE was used (drying for 10 minutes at 70° C.). As clear coat LMKL Wörwag 108728 R3203H (solvent borne clear coat) of Karl Wörwag Lack-und Farbenfabrik GmbH & Co.KG was used (drying for 45 minutes at 80° C.).

After painting, the test panels were dried for 3 days at 50° C.

Afterwards the painted test panels were scratched with a Cutter 301 (according to DIN EN/ISO 17872:2007) such that a pre-fabricated scratch template was obtained.

Adhesion test: For the adhesion characterization, the resistance of the pre-fabricated scratch template to pressure-water jetting according to DIN 55662 (Method C) was tested. A steam of hot water with temperature T was directed for time t at distance d under angle α to the surface of the test panel. Pressure of the water jet results from the water flow rate and is determined by the type of nozzle installed at the end of the water pipe.

The following parameters were used:

T (water)=60° C.; t=60 s; d=130 mm, α=90°, water flow rate 11.3 l/min, nozzle type=MPEG 2506.

The adhesion level was assessed by quantifying the failed average area per test point.

For each example 5 panels (size 80 mm×150 mm×2 mm) have been tested. The panels were produced by injection moulding with 240° C. melt temperature and 50° C. mould temperature. The flow front velocity was 100 mm/s.

On each panel 5 certain points (see FIG. 1) were used to assess the paintability failure in [mm$^2$]. For this purpose an image of the test point before and after steam jet exposure was taken. Then the delaminated area was calculated with an image processing software. The average failed area for 5 test points on 5 test specimens (i.e. in total the average of 25 test points) was reported as average failed area.

2. Examples

The catalyst used in the polymerization process for the examples R-PP, HECO1 and HECO2 has been produced as follows: First, 0.1 mol of MgCl$_2$×3 EtOH was suspended under inert conditions in 250 ml of decane in a reactor at atmospheric pressure. The solution was cooled to the temperature of 15° C. and 300 ml of cold TiCl$_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of TiCl$_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. As co-catalyst triethyl-aluminium (TEAL) and as donor dicyclo pentyl dimethoxy silane (D-donor) was used. The aluminium to donor ratio is indicated in Table 1.

Before the polymerization, the catalyst was prepolymerized with vinyl cyclohexane in an amount to achieve a concentration of 200 ppm poly(vinyl cyclohexane) (PVCH) in the final polymer. The respective process is described in EP 1 028 984 and EP 1 183 307.

As additives 0.04 wt. % synthetic hydrotalcite (DHT-4A supplied by Kisuma Chemicals, Netherlands) and 0.15 wt % Irganox B 215 (1:2-blend of Irganox 1010 (Pentaerythrityl-tetrakis(3-(3',5'-di-tert.butyl-4-hydroxytoluyl)-propionate and tris (2,4-di-t-butylphenyl) phosphate)phosphite) of BASF AG, Germany were added to the polymers in the same step. The analytics of the prepared samples can be also gathered from Tables 1 and 2.

The polymers were mixed with the mineral filler and extruded using a PRISM TSE 24 twin screw extruder with an L/D ratio of 30:1 and two sets of kneading blocks in the screw configuration using a melt temperature profile between 200 and 240° C.

TABLE 1a

Polymerization conditions of propylene copolymer R-PP

| | | R-PP |
|---|---|---|
| Prepolymerisation | | |
| temperature | [° C.] | 30 |
| pressure | [bar] | 52.5 |
| Residence time | [h] | 0.29 |
| Al/Ti ratio | [mol/mol] | 240 |
| Al/donor ratio | [mol/mol] | 5 |
| Loop | | |
| Residence time | [h] | 0.40 |
| Temperature | [° C.] | 68 |
| $H_2/C3$ ratio | [mol/kmol] | 6.63 |
| C2/C3 ratio | [mol/kmol] | 2.9 |
| $MFR_2$ | [g/10 min] | 21.3 |
| $C_2$ total | [wt.-%] | 1.4 |
| XCS | [wt.-%] | 3.1 |
| Split | [wt.-%] | 59.3 |
| GPR 1 | | |
| Residence time | [h] | 2.02 |
| Temperature | [° C.] | 70 |
| $H_2/C3$ ratio | [mol/kmol] | 116 |
| C2/C3 ratio | [mol/kmol] | 25.3 |
| $MFR_2$ | [g/10 min] | 19.8 |
| $C_2$ total | [wt.-%] | 2.2 |
| XCS | [wt.-%] | 3.3 |
| Split | [wt.-%] | 40.7 |
| Flexural modulus | [MPa] | 1550 |
| Charpy notched, +23° C. | [kJ/m$^2$] | 5.1 |

TABLE 1b

Polymerization conditions of HECO1 and HECO2

| Parameter | | unit | HECO1 | HECO2 |
|---|---|---|---|---|
| Prepolymerisation | TEAL/Ti | [mol/mol] | 946.5 | 405.9 |
| | TEAL/Donor | [mol/mol] | 8.2 | 13.4 |
| Loop | | | | |
| | temperature | [° C.] | 72 | 72 |
| | pressure | [bar] | 55 | 55 |
| | residence time | [h] | 0.42 | 0.29 |
| | H2/C3 ratio | [mol/kmol] | 20.3 | 150.2 |
| | C2 | [wt-%] | 0 | 0 |
| | XCS | [wt.-%] | 2.3 | 2.3 |
| | MFR | [g/10 min] | 97 | 55 |
| | Split | [wt.-%] | 28.4 | 52.4 |
| GPR1 | temperature | [° C.] | 87 | 82 |
| | pressure | [bar] | 22 | 22 |
| | residence time | [h] | 0.39 | 0.20 |
| | H2/C3 ratio | [mol/kmol] | 184.4 | 150.2 |
| | C2 | [wt-%] | 0 | 0 |
| | XCS | [wt.-%] | 2.0 | 2.1 |
| | MFR | [g/10 min] | 85 | 60 |
| | Split | [wt.-%] | 26.3 | 47.6 |
| GPR2 | temperature | [° C.] | 65 | 72 |
| | pressure | [bar] | 21 | 19 |
| | residence time | [h] | 0.43 | 0.08 |
| | H2/C2 ratio | [mol/kmol] | 22.0 | 134.3 |
| | C2/C3 ratio | [mol/kmol] | 324 | 557 |
| | C2 | [wt %] | 9.2 | 9.1 |
| | XCS | [wt.-%] | 20.5 | 21.1 |
| | C2 in XCS | [wt %] | | 33.6 |
| | MFR | [g/10 min] | 16.4 | 20.9 |
| | IV of XCS | [dl/g] | | 2.5 |
| | Split | [wt.-%] | 17.8 | 13.2 |
| GPR3 | temperature | [° C.] | 70 | 85 |
| | pressure | [bar] | 19 | 19 |
| | residence time | [h] | 0.59 | 0.04 |
| | H2/C2 ratio | [mol/kmol] | 22.0 | 146.9 |
| | C2/C3 ratio | [mol/kmol] | 326 | 553 |
| | C2 | [wt %] | 12.6 | 15.8 |
| | XCS | [wt %] | 29 | 33.9 |
| | C2 in XCS | [wt %] | 25.0 | 34.1 |
| | MFR | [g/10 min] | 3.6 | 11.6 |
| | IV of XCS | [dl/g] | 5.9 | 2.4 |
| | Split | [wt.-%] | 27.5 | 12.1 |

TABLE 2

Composition and properties of the prepared polypropylene compositions

| | | CE1 | CE2 | CE3 | CE4 | CE5 | IE1 | IE2 | IE3 |
|---|---|---|---|---|---|---|---|---|---|
| HECO1 | [wt.-%] | | | | | | | | 30 |
| HECO2 | [wt.-%] | | | | | | 30 | 50 | |
| HECO3 | [wt.-%] | 62.5 | | | | | | | |
| HECO4 | [wt.-%] | | 62.5 | | | | | | |
| HECO5 | [wt.-%] | | | | | 30 | 50 | | |
| R-PP | [wt.-%] | | | 66.5 | 36.5 | 16.5 | 36.5 | 16.5 | 36.5 |
| E | [wt.-%] | | | | | | | | |
| Talc | [wt.-%] | 30 | 30 | 30 | 30 | 30 | 30 | 30 | 30 |
| $MFR_2$ | [g/10 min] | 14.0 | 8.0 | 16.8 | 12.9 | 10.2 | 12.8 | 10.4 | 8.5 |
| Tensile Modulus | [Mpa] | 4103 | 4055 | 4023 | 3553 | 3109 | 3774 | 3604 | 3632 |
| Impact strength, +23° C. | [kJ/m$^2$] | 4.4 | 4.6 | 1.9 | 2.9 | 6.5 | 2.8 | 4.8 | 4.1 |
| Impact strength, −20° C. | [kJ/m$^2$] | — | — | 1.2 | 1.3 | 1.9 | 1.3 | 2.1 | 1.4 |
| Average failed area | [mm$^2$] | 99 | 95 | 8 | 111 | 93 | 25 | 53 | 16 |

Remaining part to 100 wt.-% are additives, like antioxidants, nucleating agents, carbon black etc.

HECO3 is the commercial product BF970MO of Borealis AG, which is a heterophasic polypropylene having a melt flow rate $MFR_2$ (230° C.) of 20 g/10 min.

HECO4 is the commercial product BE677A1 of Borealis AG, which is a heterophasic polypropylene having a melt flow rate $MFR_2$ (230° C.) of 13.5 g/10 min.

HECO5 is the commercial product EE041AE of Borealis AG, which is a heterophasic polypropylene having a melt flow rate $MFR_2$ (230° C.) of 11.0 g/10 min and an intrinsic visvosity (IV) of 2.1 dl/g.

Talc is the commercial product Luzenac HAR T84 of Luzenac having a BET of 16 $m^2/g$ and an average particle size (d50) of 11.5 μm.

E is the commercial product Engage 8100 of Borealis Plastomers, which is an ethylene-1-octene copolymer having a density of 0.870 $g/cm^3$ and a melt flow rate $MFR_2$ (190° C.) of 1.1 g/10 min.

The invention claimed is:

1. Polypropylene composition (C), the polypropylene composition (C) comprising:
    (a) 15.0 to 60.0 wt. %, based on the total weight of the composition (C), of a heterophasic propylene copolymer (HECO),
        (a1) said heterophasic propylene copolymer (HECO) has a melt flow rate $MFR_2$ (230° C.) measured according to ISO 1133 in the range of above 1.0 to 20.0 g/10 min;
        (a2) the xylene cold soluble (XCS) fraction of the heterophasic propylene copolymer (HECO) has an intrinsic viscosity determined according to DIN ISO 1628/1 (in decalin at 135° C.) in the range of more than 2.1 to 9.0 dl/g; and
        (a3) the comonomer content of the xylene cold soluble (XCS) fraction of the heterophasic propylene copolymer (HECO) is in the range of 10.0 to 45.0 wt. %;
    (b) 10.0 to 45.0 wt. %, based on the total weight of the composition (C), of a propylene copolymer (R-PP) having
        (b1) a comonomer content in the range of 1.5 to 8.0 wt. %; and
        (b2) a melt flow rate $MFR_2$ (230° C.) measured according to ISO 1133 in the range of 5.0 to 100.0 g/10 min; and
    (c) 20.0 to 40.0 wt. %, based on the total weight of the composition (C), of a mineral filler (F) being selected from the group consisting of talcum, wollastonite, caolin and mica.

2. The polypropylene composition (C) according to claim 1, wherein the polypropylene composition (C) has a melt flow rate $MFR_2$ (230° C.) measured according to ISO 1133 in the range of 3.0 to 45.0 g/10 min.

3. The polypropylene composition (C) according to claim 1, wherein the heterophasic propylene copolymer (HECO) comprises a propylene homopolymer (H-PP) acting as a matrix and an elastomeric propylene copolymer (E) being dispersed in said matrix, wherein:
    (a) said propylene homopolymer (H-PP) has a melt flow rate $MFR_2$ (230° C.) measured according to ISO 1133 in the range of above 35 to 400 g/10 min; and/or
    (b) the heterophasic propylene copolymer (HECO) fulfills the in-equation (III):

$$\frac{MFR(HPP)}{MFR(HECO)} \geq 3.0 \quad (III)$$

wherein:
    MFR(HPP) is the melt flow rate MFR (230° C.) measured according to ISO 1133 of the propylene homopolymer (H-PP), and
    MFR(HECO) is the melt flow rate MFR (230° C.) measured according to ISO 1133 of the heterophasic propylene copolymer (HECO).

4. The polypropylene composition (C) according to claim 1, wherein the heterophasic propylene copolymer (HECO) has
    (a) a comonomer content in the range of 5.0 to 20 wt. %; and/or
    (b) a xylene cold soluble content (XCS) determined according to ISO 16152 (25° C.) of below 45.0 wt. %.

5. The polypropylene composition (C) according to claim 1, wherein the polypropylene composition (C) fulfils:
    (a) the in-equation (I):

$$\frac{MFR(RPP)}{MFR(HECO)} > 1.70 \quad (I)$$

wherein:
    MFR(RPP) is the melt flow rate MFR (230° C.) measured according to ISO 1133 of the propylene copolymer (R-PP), and
    MFR(HECO) is the melt flow rate MFR (230° C.) measured according to ISO 1133 of the heterophasic propylene copolymer (HECO); and/or
    (b) the in-equation (II)

$$\frac{MFR(HPP)}{MFR(RPP)} > 1.80 \quad (II)$$

wherein:
    MFR(HPP) is the melt flow rate MFR (230° C.) measured according to ISO 1133 of the propylene homopolymer (H-PP) of the heterophasic propylene copolymer (HECO), and
    MFR(RPP) is the melt flow rate MFR (230° C.) measured according to ISO 1133 of the propylene copolymer (R-PP).

6. The polypropylene composition (C) according to claim 1, wherein the propylene copolymer (R-PP) has:
    (a) a glass transition temperature in the range of −12 to +2° C.; and/or
    (b) no glass transition temperature below −20° C.

7. The polypropylene composition (C) according to claim 1, wherein the propylene copolymer (R-PP) has
    (a) a melting temperature in the range of 135 to 165° C., and/or
    (b) a tensile modulus of at least 800 MPa, and/or
    (c) a Charpy notched impact strength at +23° C. of ≥4 $kJ/m^2$.

8. The polypropylene composition (C) according to claim 1, wherein the propylene copolymer (R-PP):
    (a) has 2,1 regio-defects of at most 0.4% determined by $^{13}$C-NMR spectroscopy; and/or
    (b) is monophasic.

9. The polypropylene composition (C) according to claim 1, wherein the propylene copolymer (R-PP) comprises a comonomer selected from ethylene, $C_4$ to $C_{12}$ α-olefin, and mixtures thereof.

10. The polypropylene composition (C) according to claim 1, wherein the propylene copolymer (R-PP) comprises two fractions, a first propylene copolymer fraction (R-PP1) and a second propylene copolymer fraction (R-PP2), said first propylene copolymer fraction (R-PP1) differs from said second propylene copolymer fraction (R-PP2) in the comonomer content.

11. The polypropylene composition (C) according to claim 10, wherein:
   (a) the weight ratio between the first propylene copolymer fraction (R-PP1) and the second propylene copolymer fraction (R-PP2) of the propylene copolymer (R-PP) [(R-PP1):(R-PP2)] is 70:30 to 30:70; and/or
   (b) the comonomers for the first propylene copolymer fraction (R-PP1) and the second propylene copolymer fraction (R-PP2) of the propylene copolymer (R-PP) are selected from ethylene, $C_4$ to $C_{12}$ α-olefin, and mixtures thereof.

12. The polypropylene composition (C) according to claim 10, wherein:
   (a) the first propylene copolymer fraction (R-PP1) of the propylene copolymer (R-PP) is the comonomer lean fraction and the second propylene copolymer fraction (R-PP2) of the propylene copolymer (R-PP) is the comonomer rich fraction, and/or
   (b) the first propylene copolymer fraction (R-PP1) of the propylene copolymer (R-PP) has a lower comonomer content than the propylene copolymer (R-PP).

13. The polypropylene composition (C) according to claim 10, wherein:
   (a) the first propylene copolymer fraction (R-PP1) and the second propylene copolymer fraction (R-PP2) of the propylene copolymer (R-PP) fulfill together the in-equation (IV):

$$\frac{Co(R-PP2)}{Co(R-PP1)} \geq 1.0; \qquad (IV)$$

wherein:
Co (R-PP1) is the comonomer content [wt.-%] of the first propylene copolymer fraction (R-PP1),
Co (R-PP2) is the comonomer content [wt.-%] of the second propylene copolymer fraction (R-PP2), and/or,
   (b) the first propylene copolymer fraction (R-PP1) and the propylene copolymer (R-PP) fulfill together the in-equation (V):

$$\frac{Co(R-PP)}{Co(R-PP1)} \geq 1.0 \qquad (V)$$

wherein:
Co (R-PP1) is the comonomer content [wt.-%] of the first propylene copolymer fraction (R-PP1),
Co (R-PP) is the comonomer content [wt.-%] of the propylene copolymer (R-PP).

14. The polypropylene composition (C) according to claim 1, wherein the mineral filler (F) is talc.

15. Article comprising a polypropylene composition (C) according to claim 1.

16. The article according to claim 15, wherein the article is an automotive article selected from bumpers, body panels, rocker panels, side trims, step assists, spoilers and dash boards.

* * * * *